US010073326B2

(12) United States Patent
Zhou et al.

(10) Patent No.: US 10,073,326 B2
(45) Date of Patent: Sep. 11, 2018

(54) GIMBAL

(71) Applicant: SZ DJI OSMO TECHNOLOGY CO., LTD., Shenzhen (CN)

(72) Inventors: Li Zhou, Shenzhen (CN); Yanchong Zhao, Shenzhen (CN)

(73) Assignee: SZ DJI OSMO TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 15/410,856

(22) Filed: Jan. 20, 2017

(65) Prior Publication Data
US 2017/0131623 A1 May 11, 2017

Related U.S. Application Data

(63) Continuation of application No. PCT/CN2014/084273, filed on Aug. 13, 2014.

(51) Int. Cl.
G03B 17/56 (2006.01)
F16M 13/02 (2006.01)
(Continued)

(52) U.S. Cl.
CPC ........... *G03B 17/561* (2013.01); *F16M 13/02* (2013.01); *H04N 5/2253* (2013.01); *F16M 11/04* (2013.01);
(Continued)

(58) Field of Classification Search
CPC ...................................... G03B 17/56
(Continued)

(56) References Cited

U.S. PATENT DOCUMENTS 4,389,675 A * 6/1983 Suzuki ............... H04N 5/23293
348/341
5,708,890 A 1/1998 Nakano
(Continued)

FOREIGN PATENT DOCUMENTS

CN 101342700 A 1/2009
CN 203258324 * 10/2013 ............. F16M 11/42
(Continued)

OTHER PUBLICATIONS

The World Intellectual Property Organization (WIPO) International Search Report for PCT/CN2014/084273 dated Dec. 30, 2014 p. 1-6.

Primary Examiner — Clayton E Laballe
Assistant Examiner — Kevin Butler
(74) Attorney, Agent, or Firm — Anova Law Group, PLLC

(57) ABSTRACT

A gimbal comprises a first support frame, a second support frame, a third support frame, and a support assembly. The first support frame comprises two first-frame pillars, two guiding posts, and two clamping devices. The two guiding posts are movable along a longitudinal direction of the first-frame pillars through the clamping devices. The support assembly comprises two adaptors slidably arranged on the guiding posts. The third support frame comprises a third-frame pillar and a connecting plate. The gimbal further comprises at least one center of gravity adjusting unit which is arranged at least on the first-frame pillar, between the two clamping devices, or in the connecting plate. The at least one center of gravity adjusting unit is configured to at least adjust positions of the guiding posts on the first-frame pillars, positions of the adaptors on the guiding posts, or a position of the third-frame pillar on the connecting plate.

20 Claims, 9 Drawing Sheets

(51) Int. Cl.
*H04N 5/225* (2006.01)
*F16M 11/10* (2006.01)
*F16M 11/04* (2006.01)
*F16M 11/18* (2006.01)
*F16M 11/12* (2006.01)

(52) U.S. Cl.
CPC .............. *F16M 11/10* (2013.01); *F16M 11/12* (2013.01); *F16M 11/18* (2013.01)

(58) Field of Classification Search
USPC ........................................................ 396/428
See application file for complete search history.

(56) References Cited

U.S. PATENT DOCUMENTS

| | | | | |
|---|---|---|---|---|
| 6,068,223 | A * | 5/2000 | Navarro | F16M 11/14 224/265 |
| 6,536,724 | B2 * | 3/2003 | Furuta | F16M 11/123 248/178.1 |
| 7,124,656 | B2 * | 10/2006 | Miller | F16M 11/08 74/5.1 |
| 7,264,220 | B2 * | 9/2007 | Dent | B64D 47/08 248/184.1 |
| 8,128,295 | B2 * | 3/2012 | Pizzo | G03B 17/00 396/420 |
| 9,648,240 | B2 * | 5/2017 | Wang | H04N 5/2328 |
| 2007/0050139 | A1 * | 3/2007 | Sidman | F16M 11/041 318/649 |
| 2010/0079101 | A1 * | 4/2010 | Sidman | F16M 11/041 318/649 |
| 2014/0037278 | A1 | 2/2014 | Wang | |
| 2014/0267805 | A1 * | 9/2014 | Webb | H04N 5/2328 348/208.2 |
| 2015/0219981 | A1 * | 8/2015 | Roberts | G03B 17/561 348/375 |
| 2016/0327206 | A1 * | 11/2016 | Yang | F16M 11/10 |
| 2016/0327847 | A1 * | 11/2016 | Yang | B64D 47/08 |
| 2017/0099416 | A1 * | 4/2017 | Pan | H04N 5/2253 |
| 2017/0108161 | A1 * | 4/2017 | Zhao | F16M 11/041 |
| 2017/0108761 | A1 * | 4/2017 | Pan | G03B 17/561 |
| 2017/0131623 | A1 * | 5/2017 | Zhou | G03B 17/561 |

FOREIGN PATENT DOCUMENTS

| | | | |
|---|---|---|---|
| CN | 203258324 U | 10/2013 | |
| CN | 203907156 | * 10/2014 | ............ F16M 11/12 |
| CN | 203907156 U | 10/2014 | |
| EP | 3124850 | 2/2017 | |
| EP | 3163146 A1 | 5/2017 | |
| FR | 2793870 A1 | 11/2000 | |
| JP | 2011118017 A | 6/2011 | |
| WO | 2015196485 A1 | 12/2015 | |
| WO | 2015196486 A1 | 12/2015 | |

* cited by examiner

GIMBAL

CROSS-REFERENCE TO RELATED APPLICATION

This application is a continuation application of International Application No. PCT/CN2014/084273, filed with the State Intellectual Property Office of P. R. China on Aug. 13, 2014, the entire contents of which are incorporated herein by reference.

TECHNICAL FIELD

The present disclosure relates to image shooting devices and, particularly, to a gimbal.

BACKGROUND OF THE DISCLOSURE

A gimbal may be a support for mounting a video camera which is to be disposed on the gimbal. A lens of the video camera may be adjusted to properly videotaping a target by adjusting the gimbal. A gimbal may be compatible with various types of video cameras or lenses, and the center of gravity of each axis of the gimbal may be adjustable. However, in existing mechanisms, the center of gravity may be adjusted by a relative displacement of various structures of the gimbal. Since most of the structures bear loads, an increased static friction between the structural members may lead to a difficult relative movement therebetween. Moreover, a small relative displacement may lead to a significant change in the center of gravity, making it difficult to adjust the center of gravity.

SUMMARY OF THE DISCLOSURE

An object of the present disclosure is to provide a gimbal that may be quickly adjusted to balance the center of gravity thereof.

In accordance with the present disclosure, there is provided a gimbal for carrying an imaging device, comprising a first support frame, a second support frame pivotably connected with the first support frame, a third support frame pivotably connected with the second support frame, a support assembly, and a center of gravity adjusting unit. The first support frame comprises two first-frame pillars, two clamping devices arranged on the two first-frame pillars, respectively, and a guiding post connected between the two first-frame pillars through the two clamping devices, respectively. The guiding post is configured to move along a longitudinal direction of the first-frame pillars. The third support frame comprises a third-frame pillar connected with the second support frame and a connecting plate movably arranged on the third-frame pillar. The support assembly comprises an adaptor slidably arranged on the guiding post. The center of gravity adjusting unit is arranged on one of the first-frame pillars and configured to adjust a position of the guiding post on the first-frame pillars, or arranged between the two clamping devices and configured to adjust a position of the adaptor on the guiding post, or arranged in the connecting plate and configured to adjust a position of the third-frame pillar on the connecting plate.

In some embodiments, the center of gravity adjusting unit is arranged on the one of the first-frame pillars and configured to adjust the position of the guiding post on the first-frame pillars.

In some embodiments, the center of gravity adjusting unit comprises two snap rings sleeved at two ends of the one of the first-frame pillars, respectively, and a threaded rod. One of the clamping devices is located between the two snap rings and comprises a collar having a threaded hole. The threaded rod is sleeved in the snap rings and threadedly connected with the threaded hole.

In some embodiments, the center of gravity adjusting unit further comprises two bearings. Each of the two snap rings includes a bearing hole configured to receive one of the bearings. Two ends of the threaded rod are received in the two bearings, respectively.

In some embodiments, one end of the first threaded rod is provided with a rotating handle or a driving motor configured to drive the threaded rod to rotate.

In some embodiments, the collar comprises a pillar clamping hole and a guiding post receiving portion. The pillar clamping hole has an axial direction approximately parallel to an axial direction of the threaded hole and is configured to receive the one of the first-frame pillars. A shape and a size of the pillar clamping hole correspond to a shape and a size of the one of the first-frame pillars, respectively. The guiding post receiving portion has an axial direction approximately perpendicular to an axial direction of the pillar clamping hole and is configured to receive one end of the guiding post.

In some embodiments, each of the clamping devices comprises a clamp locking member configured to release or lock the guiding post to allow an adjustment of a position of the guiding post on the corresponding first-frame pillar.

In some embodiments, the center of gravity adjusting unit is arranged between the two clamping devices and configured to adjust the position of the adaptor on the guiding post.

In some embodiments, the adaptor is a first adaptor. The support assembly further comprises a second adaptor slidably arranged on the guiding post. The center of gravity adjusting unit comprises a threaded rod and a rotating member. Two ends of the threaded rod are fixed on the two clamping devices, respectively. The rotating member is rotatably movably arranged on and threadedly connected with the threaded rod. The rotating member is arranged between the first adaptor and the second adaptor.

In some embodiments, each of the clamping devices comprises a collar having a rod fixing hole provided at a middle position of the collar. Two ends of the threaded rod are fixed in the two rod fixing holes, respectively.

In some embodiments, the rotating member abuts against an inner sidewall of the first adaptor and an inner sidewall of the second adaptor. The rotating member includes a threaded hole at a central portion of the rotating member and being threadedly connected with the threaded rod.

In some embodiments, the center of gravity adjusting unit is arranged in the connecting plate and configured to adjust the position of the third-frame pillar on the connecting plate.

In some embodiments, the connecting plate comprises a bottom surface having a receiving groove. The center of gravity adjusting unit comprises a threaded rod sleeved on two sidewalls of the receiving groove and a moving member rotatably movably arranged on the threaded rod. The moving member comprises a first moving portion fixedly connected with the second support frame, and a second moving portion connected with the first moving portion and including a threaded hole inserted in the threaded hole and threadedly connected with the threaded hole.

In some embodiments, the receiving groove comprises an outer sidewall. The center of gravity adjusting unit comprises two bearings. One of the two bearings is fixed in the receiving groove, and another one of the bearings is fixed to the outer sidewall. One end of the threaded rod is sleeved in the one of the two bearings fixed in the receiving groove.

In some embodiments, a rotating handle or a driving motor is provided at one end of the threaded rod and configured to drive the threaded rod to rotate.

In some embodiments, the support assembly further comprises a mounting plate fixed to the adaptor, a supporting plate slidably arranged on the mounting plate, and a press-locking device arrange at one side of the mounting plate and configured to fix the supporting plate on the mounting plate.

In some embodiments, the adaptor comprises a first pressing block and a second pressing block disposed opposite to each other and jointly locked by a screw. A circular slot is formed between the first pressing block and the second pressing block. The guiding post is inserted in the circular slot. The adaptor is fixed on the guiding post when the screw is tightened and is capable of sliding on the guiding post along a longitudinal direction of the guiding post when the screw is released. A nut of the screw is fixed to a lever.

In some embodiments, the second support frame comprises a driving device, two second-frame pillars, and a connecting pillar connecting the two second-frame pillars. One of the second-frame pillars is pivotably connected with a rotating shaft of one of the first-frame pillars and another one of the second-frame pillars being pivotably connected with a rotating shaft of the other one of the first-frame pillars through the driving device. The two second-frame pillars and the connecting pillar jointly form a U-shaped structure.

In some embodiments, the driving device is a first driving device. The third support frame further comprises a second driving device rotatably connected to the connecting pillar to drive the second support frame to rotate. The second driving device is fixed to one end of the third-frame pillar, and another end of the third-frame pillar is connected to the connecting plate.

In some embodiments, the gimbal of claim further comprises a driving portion configured to drive the third support frame to rotate and a handle portion. The driving portion includes a brushless motor having a rotor connected to the connecting plate and a stator fixed to the handle portion.

Embodiments of the present disclosure may also be implemented by a gimbal for carrying an imaging device. The gimbal may comprise a first support frame, a second support frame pivotably connected with the first support frame, a third support frame pivotably connected with the second support frame, and a support assembly; the first support frame may comprise two first-frame pillars, two guiding posts and two clamping devices, the guiding posts being perpendicular to the two first-frame pillars, the two guiding posts being movable along a longitudinal direction of the first-frame pillars through the clamping devices; the two guiding posts support the imaging device; the support assembly may comprise two adaptors slidably arranged on the guiding posts; the third support frame may comprise a pillar connected with the second support frame and a connecting plate movably arranged on the pillar; wherein the gimbal may further comprises at least one center of gravity adjusting unit, the at least one center of gravity adjusting unit is at least arranged on the first-frame pillar, between the two clamping devices or in the connecting plate, and the at least one center of gravity adjusting unit is configured to at least adjust a position of the guiding posts on the first-frame pillar, or a position of the adaptors on the guiding posts, or a position of the pillar on the connecting plate.

In some embodiments, the at least one center of gravity adjusting unit may comprise a first center of gravity adjusting unit arranged on the first-frame pillar for adjusting the position of the guiding posts on the first-frame pillar.

In some embodiments, the at least one center of gravity adjusting unit may comprise a second center of gravity adjusting unit arranged between the two clamping devices for adjusting the position of the adaptors on the guiding posts.

In some embodiments, the at least one center of gravity adjusting unit may comprise a third center of gravity adjusting unit arranged in the connecting plate for adjusting the position of the pillar on the connecting plate.

In some embodiments, the at least one center of gravity adjusting unit may comprise a first center of gravity adjusting unit and a second center of gravity adjusting unit, the first center of gravity adjusting unit may be arranged on the first-frame pillar for adjusting the position of the guiding posts on the first-frame pillar, and the second center of gravity adjusting unit may be arranged between the two clamping devices for adjusting the position of the adaptors on the guiding posts.

In some embodiments, the at least one center of gravity adjusting unit may comprise a first center of gravity adjusting unit and a third center of gravity adjusting unit, the first center of gravity adjusting unit may be arranged on the first-frame pillar for adjusting the position of the guiding posts on the first-frame pillar, and the third center of gravity adjusting unit may be arranged in the connecting plate for adjusting the position of the pillar on the connecting plate.

In some embodiments, the at least one center of gravity adjusting unit may comprise a second center of gravity adjusting unit and a third center of gravity adjusting unit, the second center of gravity adjusting unit may be arranged between the two clamping devices for adjusting the position of the adaptors on the guiding posts, and the third center of gravity adjusting unit may be arranged in the connecting plate for adjusting the position of the pillar on the connecting plate.

In some embodiments, the at least one center of gravity adjusting unit may comprise a first center of gravity adjusting unit, a second center of gravity adjusting unit and a third center of gravity adjusting unit, the first center of gravity adjusting unit may be arranged on the first-frame pillar for adjusting the position of the guiding posts on the first-frame pillar, the second center of gravity adjusting unit may be arranged between the two clamping devices for adjusting the position of the adaptors on the guiding posts, and the third center of gravity adjusting unit may be arranged in the connecting plate for adjusting the position of the pillar on the connecting plate.

In some embodiments, the first center of gravity adjusting unit may comprise two snap rings and a first threaded rod; the two snap rings may be respectively sleeved at two ends of one of the first-frame pillars; one of the clamping devices may be located between the two snap rings; each of the two clamping devices may comprise a collar; one of the collars may be provided with a first threaded hole; and the first threaded rod may be sleeved in the snap rings and threadedly connected with the first threaded hole.

In some embodiments, the first center of gravity adjusting unit may further comprise two first bearings; the two snap rings may be respectively provided with a bearing hole; the two bearing holes may be configured to respectively receive one of the first bearings; and two ends of the first threaded rod may be respectively received in the two first bearings.

In some embodiments, one end of the first threaded rod may be provided with a first rotating handle.

In some embodiments, one end of the first threaded rod may be provided with a driving motor for driving a rotation of the first threaded rod.

In some embodiments, the collar may be provided with a pillar clamping hole, and two guiding post receiving portions respectively arranged at two sides of the pillar clamping hole; an axial direction of the pillar clamping hole may be substantially perpendicular to an axial direction of the guiding post receiving portions; a shape and a size of the pillar clamping hole may respectively correspond to a shape and a size of the first-frame pillar; the two first-frame pillars may be respectively sleeved in one of the pillar clamping holes; each of the guiding post receiving portions may be respectively configured to receive one end of the guiding post so that the two guiding posts may be arranged substantially in parallel; and an axial direction of the first threaded hole may be substantially perpendicular to an axial direction of the guiding post receiving portions.

In some embodiments, the clamping device may further comprise a clamp locking member for adjusting a mounting position of the two guiding posts on the first-frame pillar by releasing or tightening the clamp locking member.

In some embodiments, the support assembly may further comprise a mounting plate, a supporting plate slidably arranged on the mounting plate, and a press-locking device; the mounting plate may be fixed to the adaptors; the supporting plate may be slidably arranged on the mounting plate; and the press-locking device may be arranged at one side of the mounting plate for fixing the supporting plate on the mounting plate.

In some embodiments, the second center of gravity adjusting unit may comprise a second threaded rod and a rotating member rotatably movably arranged on the second threaded rod; both ends of the second threaded rod may be respectively fixed on the two clamping devices; and the rotating member may be arranged between the two adaptors and threadedly connected with the second threaded rod.

In some embodiments, a rod fixing hole may be provided at a middle position of each of the two collars, and two ends of the second threaded rod may be respectively fixed in the two rod fixing holes.

In some embodiments, the rotating member may abut against an inner sidewall of the two adaptors; a threaded hole may be provided at a central portion of the rotating member; and the threaded hole of the rotating member may be threadedly connected with the second threaded rod.

In some embodiments, each of the adaptors may comprise a first pressing block and a second pressing block disposed opposite to each other; two circular slots may be formed between the first pressing block and the second pressing block; the guiding posts may be respectively inserted in the circular slots; the first pressing block and the second pressing block may be jointly locked by a screw; and the adaptor may be fixed on the guiding posts when the screw is tightened, and may be capable of sliding on the guiding posts along a longitudinal direction of the guiding posts when the screw is released.

In some embodiments, a nut of the screw may be fixed to a lever.

In some embodiments, the second support frame may comprise two second-frame pillars, a first driving device and a connecting pillar connecting the two second-frame pillars; the two second-frame pillars and the connecting pillar may jointly form a U-shaped structure, one of the second-frame pillars may be pivotably connected with a rotating shaft of one of the first-frame pillars, and the other one of the second-frame pillars may be pivotably connected with a rotating shaft of the other one of the first-frame pillars through the first driving device.

In some embodiments, the third support frame may further comprise a second driving device rotatably connected to the second-frame pillars to drive the second support frame, the second driving device may be fixed to one end of the pillar; the second driving device may be rotatably connected to the connecting pillar to drive a rotation of the second support frame; and the other end of the pillar may be connected to the connecting plate.

In some embodiments, the gimbal may further comprise a driving portion and a handle portion; the driving portion may be a brushless motor having a rotor connected to the connecting plate and a stator fixed to the handle portion; and the driving portion may be configured to drive a rotation of the third support frame.

In some embodiments, the third center of gravity adjusting unit may comprise a third threaded rod and a moving member rotatably movably arranged on the third threaded rod; the connecting plate may comprise a bottom surface; the bottom surface may be provided with a receiving groove; the third threaded rod may be sleeved on two sidewalls of the receiving groove; the moving member may comprise a first moving portion and a second moving portion connected with the first moving portion; the first moving portion may be fixedly connected with the second support frame; the second moving portion may be provided with a second threaded hole; and the third threaded rod may pass through the second threaded hole and may be threadedly connected with the second threaded hole.

In some embodiments, the third center of gravity adjusting unit may comprise two second bearings; the receiving groove may comprise a outer sidewall; one of the two second bearings may be fixed in the receiving groove, and the other one of the second bearings may be fixed to the outer sidewall; one end of the third threaded rod may be sleeved in one of the second bearings that is received in the receiving groove.

In some embodiments, a second rotating handle may be provided at one end of the third threaded rod.

In some embodiments, a driving motor may be provided at one end of the third threaded rod for driving a rotation of the third threaded rod.

Embodiments of the present disclosure may be implemented by a gimbal for carrying an imaging device. The gimbal may comprise a first support frame; the first support frame may comprise two first-frame pillars, two guiding posts and two clamping devices; the guiding posts may be arranged substantially perpendicular to the two first-frame pillars; the two guiding posts may be movable along a longitudinal direction of the first-frame pillars through the clamping devices; the two guiding posts may be configured to carry the imaging device; the gimbal may further comprise a center of gravity adjusting unit arranged on the first-frame pillar for at least adjusting a position of the guiding posts on the first-frame pillar.

In some embodiments, the center of gravity adjusting unit may comprise two snap rings and a first threaded rod; the two snap rings may be respectively sleeved at both ends of one of the first-frame pillars; one of the clamping devices may be located between the two snap rings; each of the two clamping devices may comprise a collar; one of the collars may be provided with a first threaded hole; and the first threaded rod may be sleeved in the snap rings and threadedly connected with the first threaded hole.

In some embodiments, the center of gravity adjusting unit may further comprise two first bearings; the two snap rings may be respectively provided with a bearing hole; the two bearing holes may be configured to respectively receive one of the first bearings; and two ends of the first threaded rod may be respectively received in the two first bearings.

In some embodiments, one end of the first threaded rod may be provided with a first rotating handle.

In some embodiments, one end of the first threaded rod may be provided with a driving motor for driving a rotation of the first threaded rod.

In some embodiments, the collar may be provided with a pillar clamping hole, and two guiding post receiving portions respectively arranged at two sides of the pillar clamping hole; an axial direction of the pillar clamping hole may be substantially perpendicular to an axial direction of the guiding post receiving portions; a shape and a size of the pillar clamping hole may respectively correspond to a shape and a size of the first-frame pillar; the two first-frame pillars may be respectively sleeved in one of the pillar clamping holes; each of the guiding post receiving portions may be respectively configured to receive one end of the guiding post so that the two guiding posts may be arranged substantially in parallel; and an axial direction of the first threaded hole may be substantially perpendicular to an axial direction of the guiding post receiving portions.

In some embodiments, the clamping device may further comprise a clamp locking member for adjusting a mounting position of the two guiding posts on the first-frame pillar by releasing or tightening the clamp locking member.

In some embodiments, the gimbal may further comprise a support assembly; the support assembly may further comprise a mounting plate, a supporting plate slidably arranged on the mounting plate, and a pressing device; the mounting plate may be fixed to the adaptors; the supporting plate may be slidably arranged on the mounting plate; and the press-locking device may be arranged at one side of the mounting plate for fixing the supporting plate on the mounting plate.

In some embodiments, each of the adaptors may comprise a first pressing block and a second pressing block disposed opposite to each other; two circular slots may be formed between the first pressing block and the second pressing block; the guiding posts may be respectively inserted in the circular slots; the first pressing block and the second pressing block may be jointly locked by a screw; and the adaptor may be fixed on the guiding posts when the screw is tightened, and the adaptor may be capable of sliding on the guiding posts along a longitudinal direction of the guiding posts when the screw is released.

In some embodiments, a nut of the screw may be fixed to a lever.

Embodiments of the present disclosure may be implemented by a gimbal for carrying an imaging device. The gimbal may comprise a first support frame and a support assembly; the first support frame may comprise two first-frame pillars, two guiding posts and two clamping devices; the guiding posts may be arranged perpendicular to the two first-frame pillars; the two guiding posts may be movable along a longitudinal direction of the first-frame pillars through the clamping devices; the two guiding posts may be configured to carry the imaging device; the support assembly comprises two adaptors slidably arranged on the guiding posts; and the gimbal may further comprise a center of gravity adjusting unit arranged between the two clamping devices for adjusting a position of the adaptors on the guiding posts.

In some embodiments, the support assembly may further comprise a mounting plate, a supporting plate slidably arranged on the mounting plate, and a pressing device; the mounting plate may be fixed to the adaptors; the supporting plate may be slidably arranged on the mounting plate; and the press-locking device may be arranged at one side of the mounting plate for fixing the supporting plate on the mounting plate.

In some embodiments, the center of gravity adjusting unit may comprise a threaded rod and a rotating member rotatably movably arranged on the threaded rod; two ends of the threaded rod may be respectively fixed on the two clamping devices; and the rotating member may be arranged between the two adaptors and threadedly connected with the threaded rod.

In some embodiments, a rod fixing hole may be provided at a middle position of each of the two collars, and two ends of the threaded rod may be respectively fixed in the two rod fixing holes.

In some embodiments, the rotating member may abut against an inner sidewall of the two adaptors; a threaded hole may be provided at a central portion of the rotating member; and the threaded hole of the rotating member may be threadedly connected with the threaded rod.

In some embodiments, each of the adaptors may comprise a first pressing block and a second pressing block disposed opposite to each other; two circular slots may be formed between the first pressing block and the second pressing block; the guiding posts may be respectively inserted in the circular slots; the first pressing block and the second pressing block may be jointly locked by a screw; and the adaptor may be fixed on the guiding posts when the screw is tightened, and may be capable of sliding on the guiding posts along a longitudinal direction of the guiding posts when the screw is released.

In some embodiments, a nut of the screw may be fixed to a lever.

Embodiments of the present disclosure may be implemented by a gimbal for carrying an imaging device. The gimbal may comprise a first support frame, a second support frame pivotably connected with the first support frame, and a third support frame pivotably connected with the second support frame; the third support frame may comprise a pillar connected with the second support frame and a connecting plate movably arranged on the pillar; and the gimbal may further comprise a center of gravity adjusting unit arranged in the connecting plate for adjusting a position of the pillar on the connecting plate.

In some embodiments, the center of gravity adjusting unit may comprise a threaded rod and a moving member rotatably movably arranged on the threaded rod; the connecting plate may comprise a bottom surface; the bottom surface may be provided with a receiving groove; the threaded rod may be sleeved on two sidewalls of the receiving groove; the moving member may comprise a first moving portion and a second moving portion connected with the first moving portion; the first moving portion may be fixedly connected with the second support frame; the second moving portion may be provided with a threaded hole; and the threaded rod may pass through the threaded hole and may be threadedly connected with the threaded hole.

In some embodiments, the center of gravity adjusting unit may comprise two bearings; the receiving groove may comprise a outer sidewall; one of the two bearings may be fixed in the receiving groove, and the other one of the bearings may be fixed to the outer sidewall; one end of the threaded rod is sleeved in the one of the bearings which is received in the receiving groove.

In some embodiments, a second rotating handle may be provided at one end of the threaded rod.

In some embodiments, a driving motor may be provided at one end of the threaded rod for driving a rotation of the threaded rod.

As compared with the conventional technologies, the gimbal of the present disclosure may further comprise at least one center of gravity adjusting unit. The at least one center of gravity adjusting unit may be arranged at least on the first-frame pillar, between the two clamping devices or in the connecting plate, and may be configured to adjust at least a position of the guiding posts on the first-frame pillar, a position of the adaptors on the guiding posts, or a position of the pillar on the connecting plate. The center of gravity of the gimbal can be adjusted by the at least one center of gravity adjusting unit.

DETAILED DESCRIPTION OF THE EMBODIMENTS

The technical solution of the present disclosure will be described in detail below with reference to the embodiments of the disclosure in combination with the drawings. It should be appreciated that embodiments described herein are only some rather than all of the embodiments of the present disclosure. All other embodiments obtained by those having ordinary skills in the art on the basis of the embodiments of the present disclosure without any inventive efforts should fall within the scope of the present disclosure.

Implementation of the present disclosure will be described in detail below, with reference to exemplary embodiments.

Figure 1:
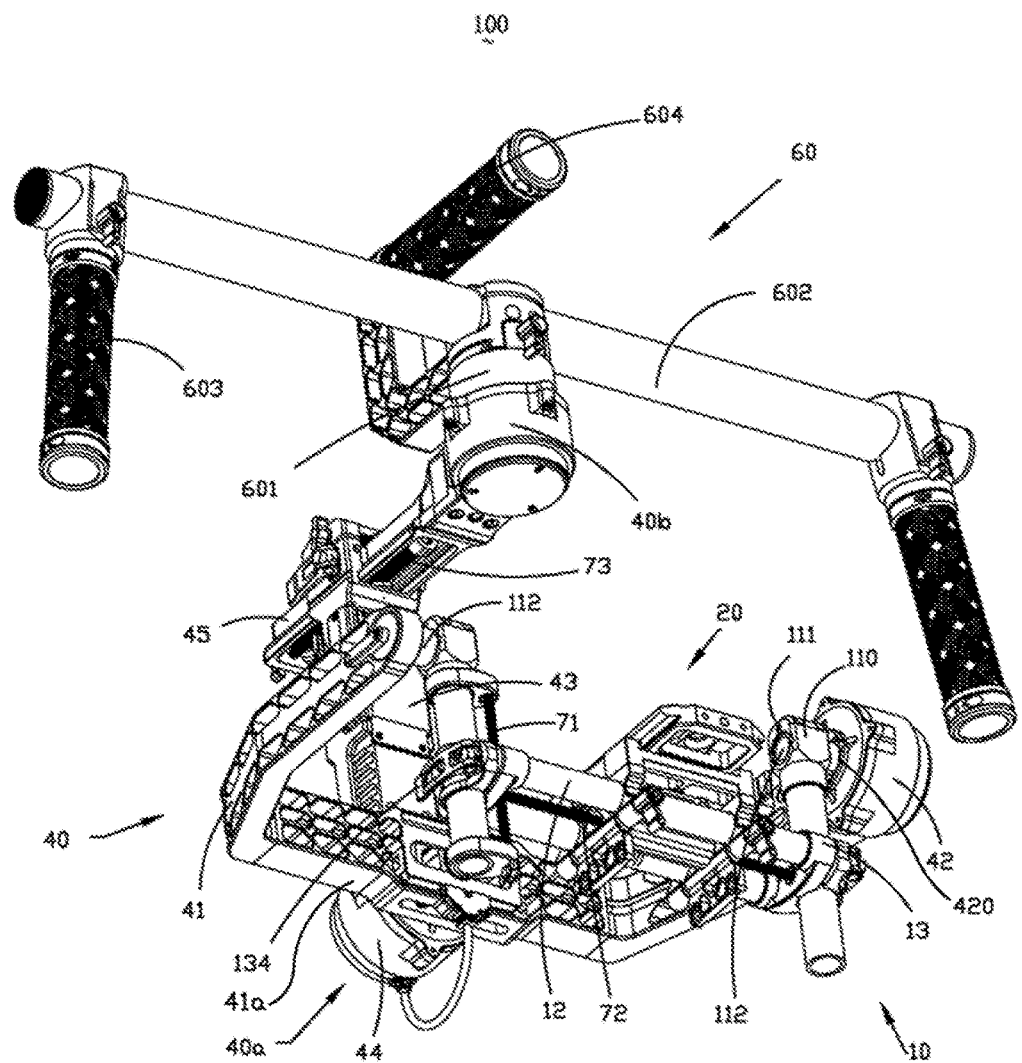
FIG. 1 is a perspective view of a gimbal according to the present disclosure.
Figure 2:
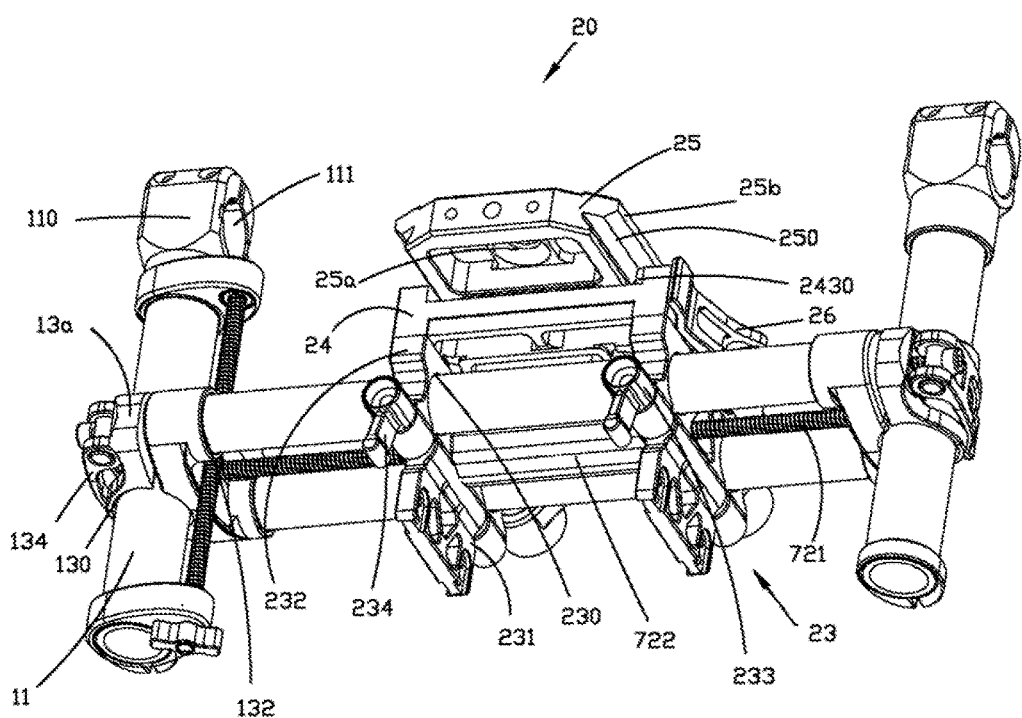
FIG. 2 is a perspective view showing a first support frame, a support assembly and a center of gravity adjusting unit in FIG. 1.
Figure 9:
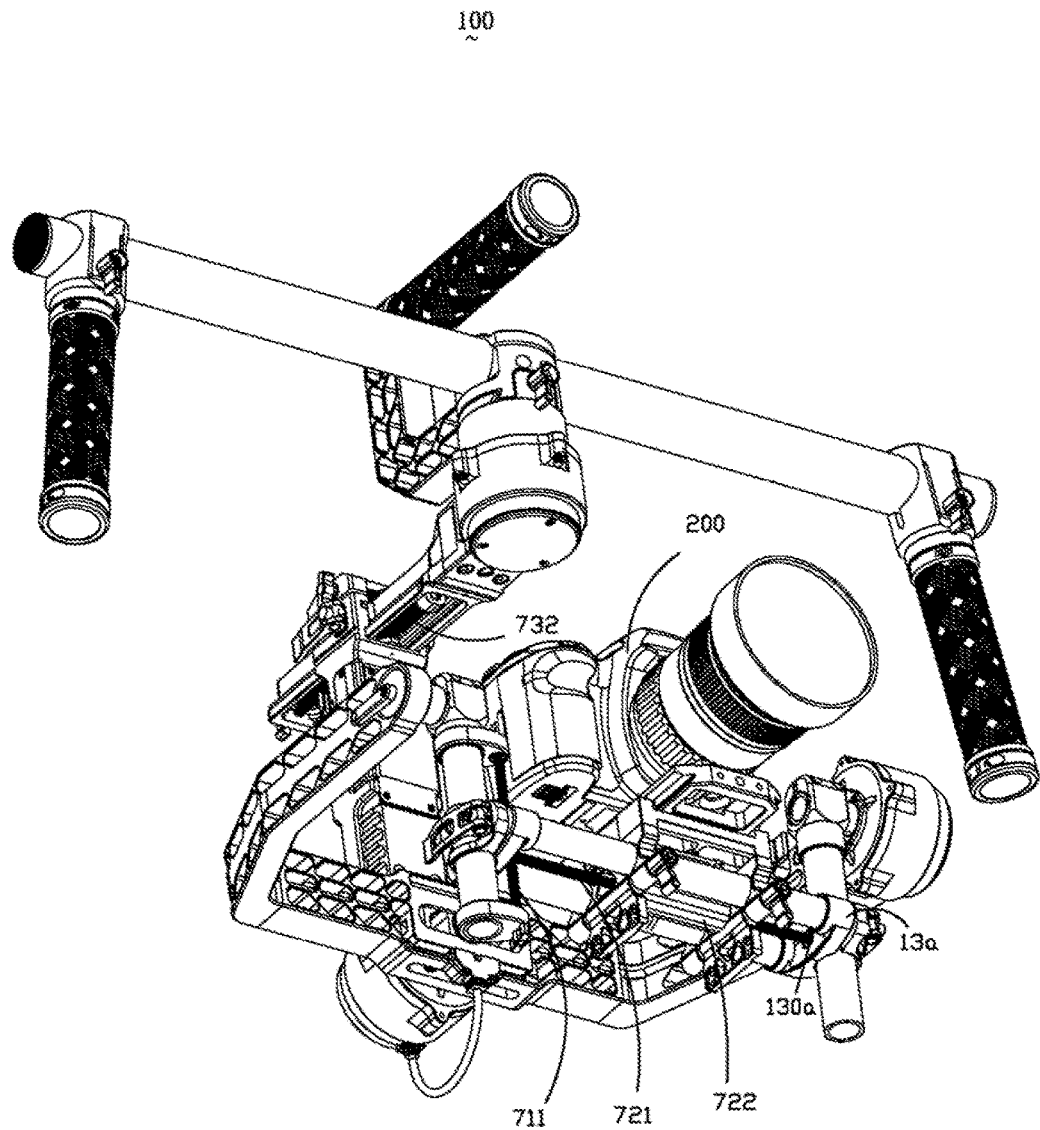
FIG. 9 is a view showing a working condition of the gimbal in FIG. 1.

Referring to FIGS. 1 and 2, the present disclosure may provide a gimbal 100 for carrying an imaging device 200 (as shown in FIG. 9). The imaging device 200 may be a camera, a camcorder, or a lens.

The gimbal 100 may comprise a first support frame 10, a support assembly 20 movably arranged on the first support frame 10, a second support frame 40 that may be hinged with the first support frame 10 and configured to drive the first support frame 10 to rotate, a third support frame 40a that may be hinged with the second support frame 40 and configured to drive the second support frame 40 to rotate, a driving portion 40b configured to drive the third support frame 40a to rotate, a handle portion 60, and three center of gravity adjusting units.

The first support frame 10 may comprise two first-frame pillars 11, two guiding posts 12, and two clamping devices 13. The two guiding posts 12 may be arranged perpendicular to the two first-frame pillars 11. The two guiding posts 12 may be movable along a longitudinal direction of the first-frame pillars 11 through the clamping devices 13, and may be fixed at any position on the first-frame pillars 11 through the clamping devices 13.

In some embodiments, the first-frame pillars 11 may be cylindrical in shape. Each one of the first-frame pillars 11 may comprise a connecting end 110. The connecting end 110 may be provided with a through-hole 111. In some embodiments, an axial direction of the through-hole 111 may be approximately perpendicular to the longitudinal direction of the first-frame pillar 11. A rotating shaft 112 may be provided in the through-hole 111. In some embodiments, the first-frame pillars 11 may be configured in other shapes.

In some embodiments, the two guiding posts 12 may be cylindrical. In some embodiments, the guiding posts 12 may be configured in other shapes.

Each of the two clamping devices 13 may comprise a collar 13a and a clamp locking member 134. The collar 13a may be provided with a pillar clamping hole 130, two guiding post receiving portions 132 arranged at two sides of the pillar clamping hole 130, respectively, and a first threaded hole 136 (shown in FIG. 4). An axial direction of the pillar clamping hole 130 may be approximately perpendicular to an axial direction of the guiding post receiving portions 132. A shape and a size of the pillar clamping hole 130 may correspond to a shape and a size of the first-frame pillar 11, respectively. The two first-frame pillars 11 may be sleeved in the pillar clamping holes 130, respectively. Each one of the guiding post receiving portions 132 may receive an end of one of the guiding posts 12, such that the two guiding posts 12 may be arranged approximately in parallel. An axial direction of the first threaded hole 136 may be approximately perpendicular to the axial direction of the guiding post receiving portions 132.

The clamp locking member 134 may be configured to lock the clamping device 13 at an arbitrary position on the first-frame pillar 11. In some embodiments, the clamp locking member 134 may be a lock catch made of a metallic material. The clamp locking member 134 may be configured to apply a pressure on the collar 13a such that a diameter of the pillar clamping hole 130 of the collar 13a is reduced to clamp the first-frame pillar 11. In some embodiments, positions of the two guiding posts 12 on the first-frame pillars 11 may be adjusted by releasing or tightening the clamp locking member 134.

The support assembly 20 may comprise two adaptors 23 slidably arranged on the guiding posts 12, a mounting plate 24, a supporting plat 25 slidably provided on the mounting plate 24, and a press-locking device 26. The mounting plate 24 may be fixed to the adaptors 23. In some embodiments, the mounting plate 24 may be fixed on the adaptors 23 by bolt(s). The supporting plate 25 may be slidably provided on the mounting plate 24. The press-locking device 26 may be arranged at one side of the mounting plate 24, and may be configured to fix the supporting plate 25 at an arbitrary position on the mounting plate 24.

In order to adjust a sliding of the adaptors 23, each of the adaptors 23 may comprise a first pressing block 231 and a second pressing block 232 which are disposed opposite to each other. Two circular slots 230 may be formed between the first pressing block 231 and the second pressing block 232, and the guiding posts 12 may be inserted in the circular slots 230, respectively. The first pressing block 231 and the second pressing block 232 may be jointly locked by a screw 233. The adaptor 23 may be fixed on the guiding posts 12 when the screw 233 is tightened. On the other hand, the adaptor 23 may be capable of sliding on the guiding posts 12 along a longitudinal direction the guiding posts 12 when the screw 233 is released.

In some embodiments, a nut of each of the screws 233 may be fixed to a lever 234 extending in a direction perpendicular to a longitudinal direction of the screw 233. The lever 234 may be rotated in a tightening direction of the screw 233 to tighten the screw 233. On the other hand, the lever 234 may be rotated in a direction opposite to the tightening direction of the screw 233 to loosen the screw 233, such that the adaptor 23 may slide along the guiding posts 12.

The mounting plate 24 may be fixed on the second pressing blocks 232. The mounting plate 24 may be provided with a first sliding slot 2430.

A plurality of screw holes 25a may be evenly provided on the supporting plate 25 along a length direction of the supporting plate 25. The screw holes 25a may be used to connect with the imaging device 200 by screws. The plurality of screw holes 25a may be used to install various types of imaging device 200 having different specifications and adjust a position of the imaging device 200 on the supporting plate 25. In some embodiments, a second sliding slot 250 matching the first sliding slot 2430 may be provided on each of two outer sidewalls 25b of the supporting plate 25 at a position corresponding to the first sliding slot 2430. In some embodiments, the second sliding slot 250 may be a dovetail sliding slot.

The press-locking device 26 may be configured to release a locking between the supporting plate 25 and the mounting plate 24, thereby allowing the supporting plate 25 to slide or to be fixed on the mounting plate 24.

The second support frame 40 may comprise two second-frame pillars 41, a first driving device 42, and a connecting pillar 41a connecting the two second-frame pillars 41. The two second-frame pillars 41 and the connecting pillar 41a may jointly form a U-shaped structure. The two second-frame pillars 41 may be arranged approximately in parallel. One of the second-frame pillars 41 may be directly pivotably connected with the rotating shaft 112 of one of the first-frame pillars 11, while the other one of the second-frame pillars 41 may be pivotably connected with the through hole 111 of the other one of the first-frame pillars 11 through the first driving device 42. In some embodiments, the first driving device 42 may be fixed to one end of the second-frame pillar 41 adjacent to the first-frame pillar 11, and a driving shaft 420 of the first driving device 42 may be fixedly connected with the through hole 111 of one of the first-frame pillars 11 to drive the first-frame pillar 11 to rotate, so as to drive the first support frame 10 to rotate. In some embodiments, an axial direction of the driving shaft 420 of the first driving device 42 may be substantially perpendicular to a longitudinal direction of the second-frame pillar 41. The first driving device 42 may drive the first support frame 10 to rotate so as to adjust a shooting angle of the imaging device 200. A rotating speed of the first driving device 42 may be adjusted timely to adapt to the attitude of the imaging device 200. In some embodiments, the first driving device 42 may be a brushless motor. In some embodiments, the first driving device 42 may be a brush motor or another motor, not limited to any particular embodiment.

The third support frame 40a may comprise a third-frame pillar 43, a second driving device 44, and a connecting plate 45. The third-frame pillar 43 may be a hollow cylinder. The second driving device 44 may be rotatably connected to the connecting pillar 41a to drive the second support frame 40 to rotate. In some embodiments, the second driving device 44 may be fixed to one end of the third-frame pillar 43. A driving shaft (not shown) of the second driving device 44 may be fixedly connected with the connecting pillar 41a to drive the connecting pillar 41a to rotate, so as to drive the second support frame 40 to rotate. The other end of the third-frame pillar 43 may be connected to the connecting plate 45. The connecting plate 45 may be substantially perpendicular to the third-frame pillar 43 and approximately parallel to a rotating shaft of the second driving device 44.

In some embodiments, the driving portion 40b may be a brushless motor having a rotor connected to the connecting plate 45 and a stator fixed to the handle portion 60. The driving portion 40b may be configured to drive the third support frame 40a to rotate 360° in the horizontal direction.

The handle portion 60 may be provided as a bent rod. In some embodiments, the handle portion 60 may comprise a connecting portion 601, a supporting portion 602, and handheld portions 603. The supporting portion 602 may be a rod member, and the connecting portion 601 may be fixedly connected to the geometric center of the supporting portion 602. The connecting portion 601 may be connected to the driving portion 40b.

The handheld portions 603 may be two cylindrical handles fixed to two ends of the supporting portion 602.

The handle portion 60 may include a handle 604. The handle 604 may be fixed to the supporting portion 602, for example, at one side of the supporting portion 602 opposite to the connecting portion 601, in order to facilitate an easy transport of the gimbal 100 when it is not in used. In some embodiments, the handle portion 60 may also be provided with a locking mechanism for a fixation on, for example, an aerial ladder to enable an automatic movement of the gimbal 100 by machinery equipment.

The three center of gravity adjusting units may be a first center of gravity adjusting unit 71, a second center of gravity adjusting unit 72, and a third center of gravity adjusting unit 73, respectively.

Figure 3:
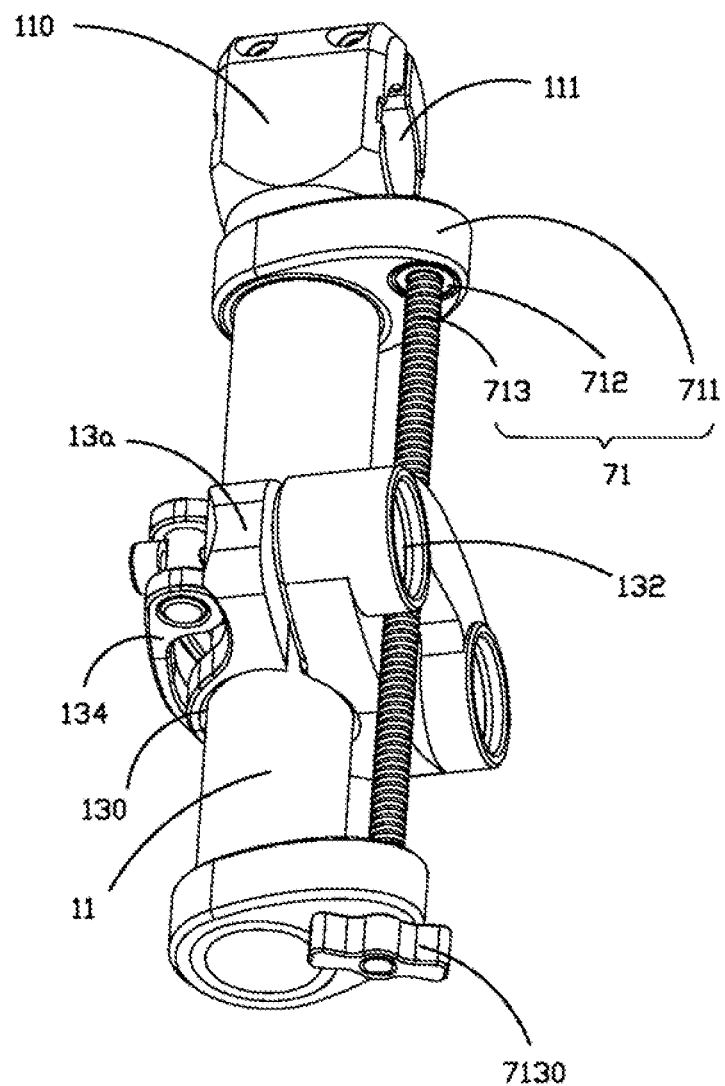
FIG. 3 is a perspective view showing a first-frame pillar and a first center of gravity adjusting unit in FIG. 2.
Figure 4:
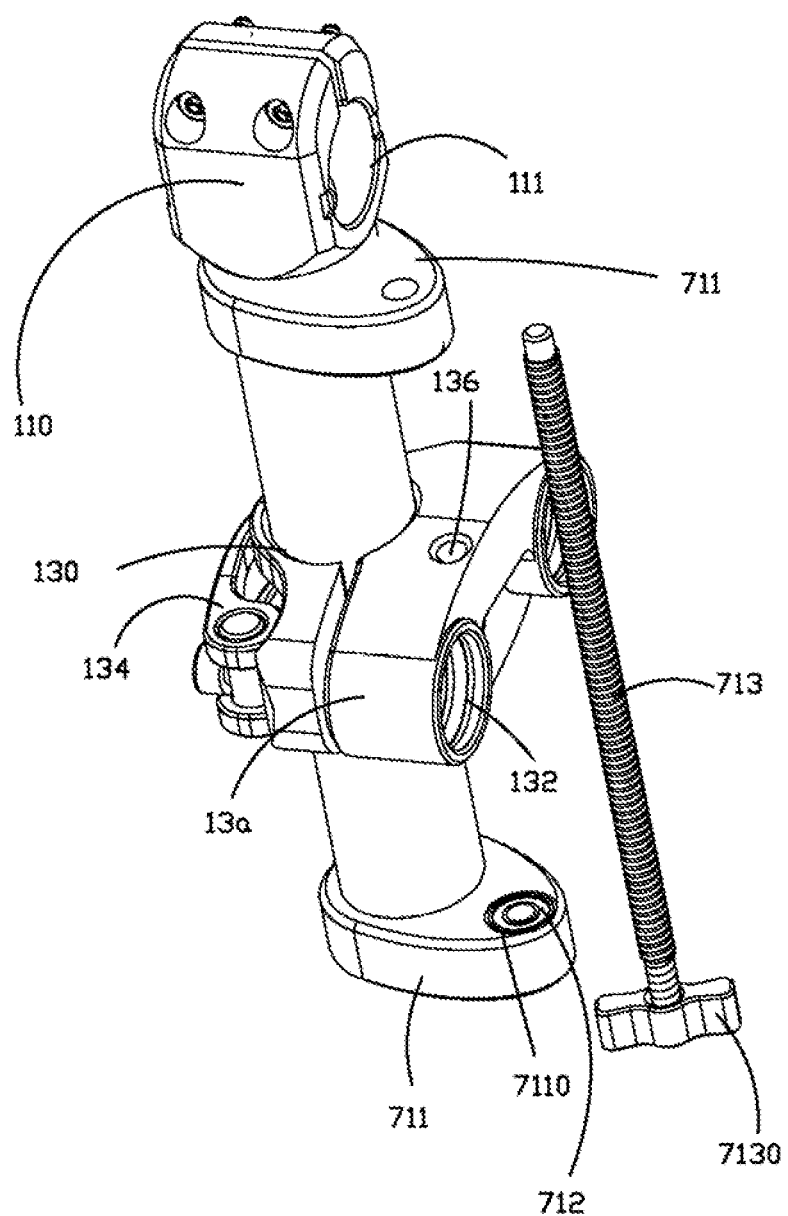
FIG. 4 is a perspective view showing a first-frame pillar and a first center of gravity adjusting unit in FIG. 3 from another angle of view.
Figure 5:
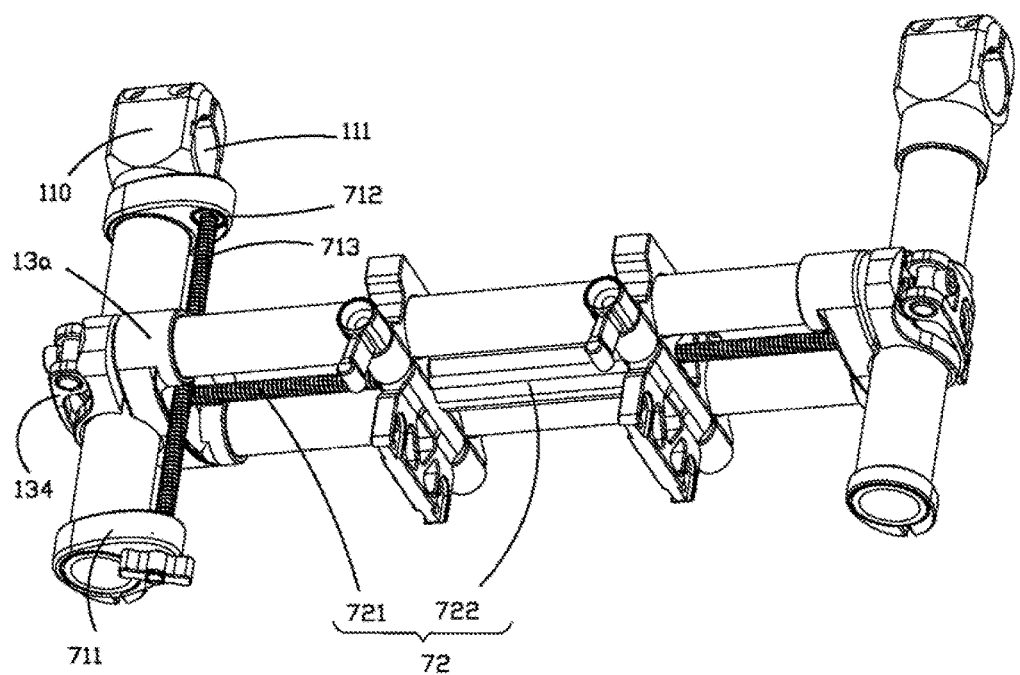
FIG. 5 is a perspective view showing the first support frame, the support assembly and the center of gravity adjusting unit in FIG. 2 from another angle of view.

Referring to FIGS. 3 to 5, the first center of gravity adjusting unit 71 may be provided on at least one of the first-frame pillars 11 to adjust a position of the guiding posts 12 relative to the first-frame pillar 11. The second center of gravity adjusting unit 72 may be provided between the two clamping devices 13 to adjust a position of the adaptors 23 on the guiding posts 12. The third center of gravity adjusting unit 73 may be provided within the connecting plate 45 to adjust a position of the third-frame pillar 43 on the connecting plate 45.

In some embodiments, the first center of gravity adjusting unit 71 may comprise two snap rings 711, two first bearings 712, and a first threaded rod 713. The two snap rings 711 may be sleeved at two ends of one of the first-frame pillars 11, respectively, and one of the clamping devices 13 may be located between the two snap rings 711. Each of the two snap rings 711 may be provided with a bearing hole 7110. Each of the two bearing holes 7110 may be configured to receive one of the first bearings 712. The first threaded rod 713 may be inserted through one of the first bearings 712 that is away from the connecting end 110 and the first threaded hole 136 of the collar 13a, with one end of the first threaded rod 713 being sleeved in the other one of the first bearings 712 that is adjacent to the connecting end 110. To facilitate a rotation of the first threaded rod 713, the first threaded rod 713 may be provided with a first rotating handle 7130 at one end of the first threaded rod 713 that is away from the connecting end 110.

In some embodiments, the first threaded rod 713 may be directly sleeved in the two snap rings 711 without the first bearings 712.

The second center of gravity adjusting unit 72 may comprise a second threaded rod 721 and a rotating member 722 provided on the second threaded rod 721 in a rotatably movable manner.

Two ends of the second threaded rod 721 may be fixed on the two clamping devices 13, respectively. In some embodiments, each end of the second threaded rod 721 may be fixed at a middle position of the corresponding clamping devices 13. In some embodiments, a rod fixing hole 130a (as shown in FIG. 9) may be provided at a middle position of each of the two collars 13a. Two ends of the second threaded rod 721 may be fixed in the two rod fixing holes 130a, respectively.

The rotating member 722 may be arranged between the two adaptors 23 and sleeved on the second threaded rod 721. In some embodiments, the rotating member 722 may abut against inner sidewalls of the two adaptors 23, and a threaded hole (not shown) may be provided at a central portion of the rotating member 722. The threaded hole of the rotating member 722 may be threadedly connected with the second threaded rod 721. Since the rotating member 722 abuts against the inner sidewalls of the two adaptors 23, a rotation of the rotating member 722 on the second threaded rod 721 may be converted to a translational movement of the adaptors 23 on the second threaded rod 721.

Figure 6:
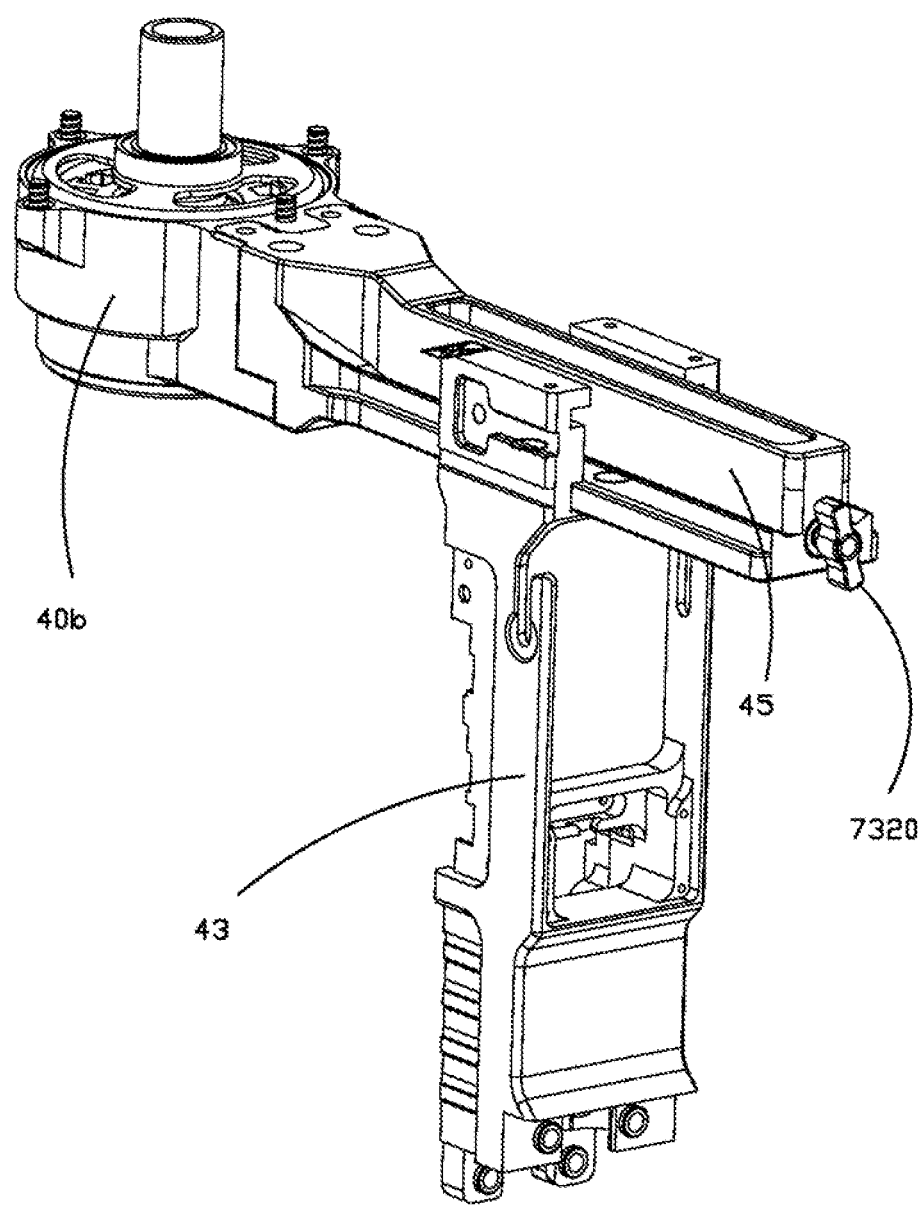
FIG. 6 is a perspective view showing a third support frame and a third center of gravity adjusting unit in FIG. 1.
Figure 7:
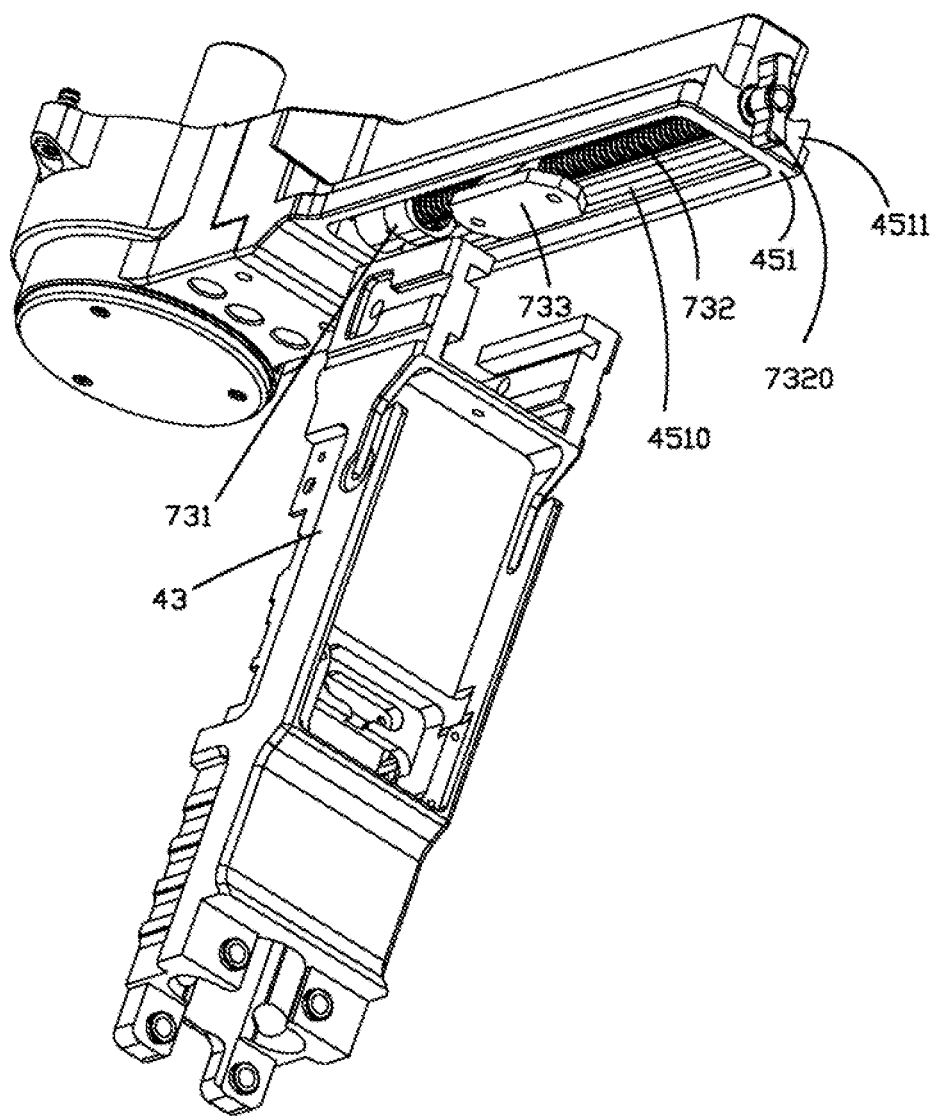
FIG. 7 is a perspective view showing the third support frame and the third center of gravity adjusting unit in FIG. 6.
Figure 8:
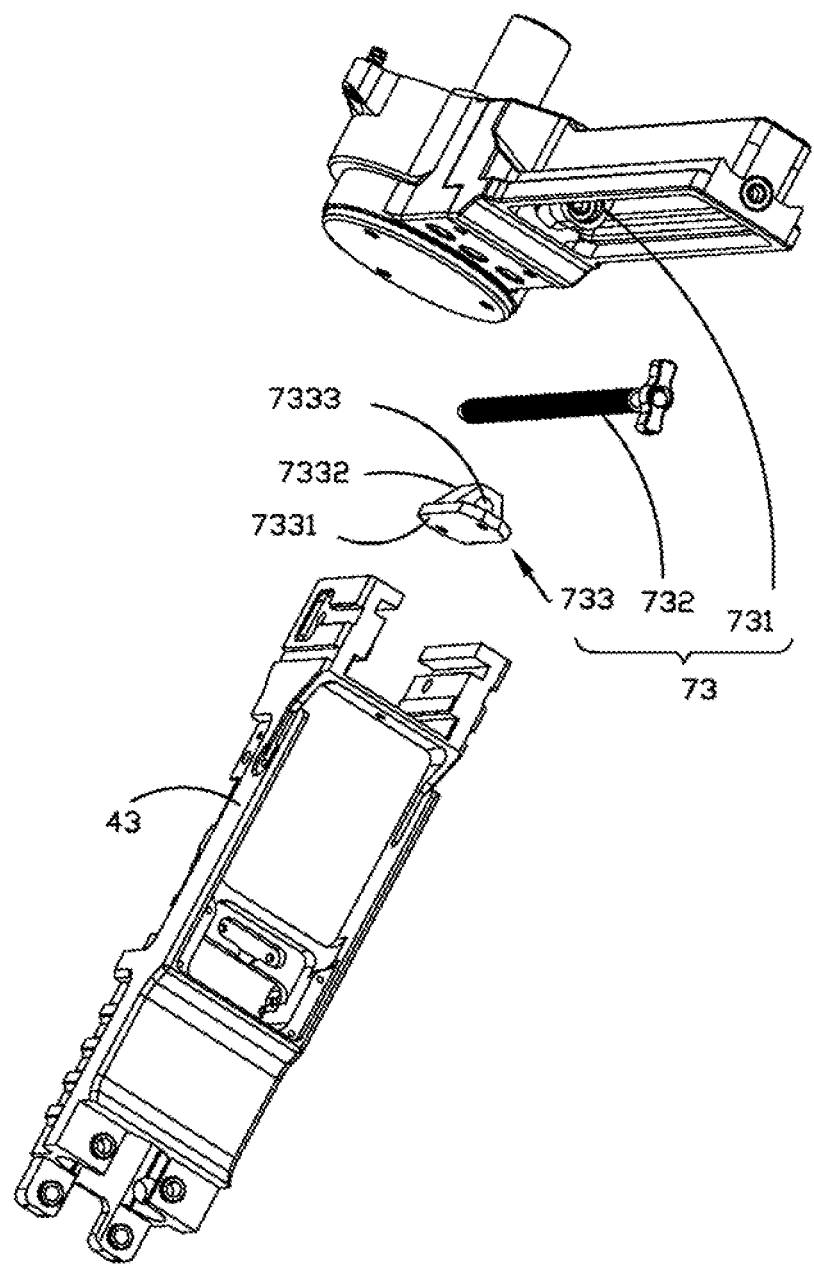
FIG. 8 is a perspective view showing the third support frame and the third center of gravity adjusting unit in FIG. 7 from another angle of view.

Referring to FIGS. 6 to 8, the third center of gravity adjusting unit 73 may comprise two second bearings 731, a third threaded rod 732, and a moving member 733 provided on the third threaded rod 732 in a rotatably movable manner.

In some embodiments, the connecting plate 45 of the third support frame 40 may comprise a bottom surface 451 in contact with the third-frame pillar 43. The bottom surface 451 may be provided with a receiving groove 4510 which may comprise a outer sidewall 4511. One of the second bearings 731 may be fixed in the receiving groove 4510, and the other one of the second bearings 731 may be fixed to the outer sidewall 4511. Axes of the two second bearings 731 may be approximately parallel to each other, and may be approximately perpendicular to the longitudinal direction of the third-frame pillar 43. The third threaded rod 732 may be inserted through one of the second bearings 731 that is fixed to the outer sidewall 4511, with one end of the third threaded rod 732 being sleeved in the other one of the second bearings 731 that is fixed in the receiving groove 4510. To facilitate a rotation of the third threaded rod 732, the third threaded rod 732 may be provided with a second rotating handle 7320 at one end of the third threaded rod 732 that is adjacent to the outer sidewall 4511.

The moving member 733 may comprise a first moving portion 7331 and a second moving portion 7332 connected with the first moving portion 7331. The first moving portion 7331 may be fixedly connected with the third-frame pillar 43. In some embodiments, the first moving portion 7331 may be fixedly connected with the third-frame pillar 43 by bolt(s). In some embodiments, the first moving portion 7331 may be fixedly connected with the third-frame pillar 43 by welding. The second moving portion 7332 may be provided with a second threaded hole 7333. The third threaded rod 732 may be inserted in the second threaded hole 7333 and may be threadedly connected with the second threaded hole 7333.

In some embodiments, the third threaded rod 732 may be directly sleeved on two sidewalls of the receiving groove 4510 without the second bearings 731.

Referring to FIG. 9, the imaging device 200 may be fixedly arranged on the support assembly 20 when in use. In order to improve the stability of the imaging device 200 during image shooting, the center of gravity of the first support frame 10, the support assembly 20, and the imaging device 200 as a whole may need to coincide with the rotating shaft of the first driving device 42. According to mechanical analysis, if the center of gravity of the first support frame 10, the support assembly 20, and the imaging device 200 as a whole coincides with the driving shaft of the first driving device 42, the first support frame 10 may not generate a rotational torque regardless of a rotation angle of the first support frame 10, i.e., the first support frame 10 may not shake back and forth due to a torque. Therefore, a stability of the imaging device 200 may be improved during a rotation of the first support frame 10. Further, if the center of gravity of the first support frame 10, the support assembly 20, the second support frame 40, and the imaging device 200 as a whole coincides with the driving shaft of the second driving device 44, the second support frame 40 may not generate a rotational torque regardless of a rotation angle of the second support frame 40, i.e., the second support frame 40 may not shake back and forth due to a torque. Therefore, the stability of the imaging device 200 may be improved during a rotation of the second support frame 40. Further, if the center of gravity of the first support frame 10, the support assembly 20, the second support frame 40, the third support frame 40a, and the imaging device 200 as a whole coincides with the driving shaft of the driving portion 40b, the third support frame 40a may not generate a rotational torque regardless of a rotation angle of the third support frame 40a, i.e., the third support frame 40a may not shake back and forth due to a torque. Therefore, the stability of the imaging device 200 may likewise be improved during a rotation of the third support frame 40A.

In case the center of gravity of the first support frame 10, the support assembly 20, and the imaging device 200 as a whole deviates from the rotating shaft of the first driving device 42, the center of gravity of the first support frame 10, the support assembly 20, and the imaging device 200 as a whole may be adjusted by the first center of gravity adjusting assembly 71, such that the center of gravity of the first support frame 10, the support assembly 20, and the imaging device 200 as a whole coincides with the rotating shaft of the first driving device 42. In some embodiments, the clamp locking member 134 may be turned and released to enlarge a diameter of the pillar clamping hole 130 of the collar 13a, thereby bringing the collar 13a and the first-frame pillar 11 into a loose fit. By rotating the first rotating handle 7130, the first threaded rod 713 may be rotated within the first bearings 712 and the first threaded hole 136, and the collar 13a may be moved along a longitudinal direction of the first threaded rod 713 to adjust the center of gravity of the first support frame 10, thereby causing the center of gravity of the first support frame 10, the support assembly 20, and the imaging device 200 as a whole to coincide with the rotating shaft of the first driving device 42.

It will be appreciated that the first rotating handle 7130 may be replaced with a driving motor which may drive the first threaded rod 713 to rotate.

It will be appreciated that, the structure of the first center of gravity adjusting assembly 71 may not be limited to the illustrated embodiment, so long as a position of the guiding posts 12 on the first-frame pillars 11 can be adjusted to cause the center of gravity of the first support frame 10, the support assembly 20, and the imaging device 200 as a whole to coincide with the rotating shaft of the first driving device 42.

In case the center of gravity of the first support frame 10, the support assembly 20, the second support frame 40, and the imaging device 200 as a whole deviates from the rotating shaft of the second driving device 44, the center of gravity of the first support frame 10, the support assembly 20, the second support frame 40, and the imaging device 200 as a whole may be adjusted by the second center of gravity adjusting assembly 72, such that the center of gravity of the first support frame 10, the support assembly 20, the second support frame 40, and the imaging device 200 as a whole coincides with the rotating shaft of the second driving device 44. In some embodiments, the screws 233 may be released to enlarge diameters of the circular slots 230, thereby bringing the adaptors 23 and the guiding posts 12 into a loose fit. The adaptors 23 may be moved on the guiding posts 12 along a longitudinal direction of the guiding posts 12 when the rotating member 722 is rotated, thereby causing the center of gravity of the first support frame 10, the support assembly 20, the second support frame 40, and the imaging device 200 as a whole to coincide with the rotating shaft of the second driving device 44.

It will be appreciated that, the structure of the second center of gravity adjusting assembly 72 may not be limited to the illustrated embodiment, so long as the positions of the adaptors 23 on the guiding posts 12 can be adjusted to cause the center of gravity of the first support frame 10, the support assembly 20, the second support frame 40, and the imaging device 200 as a whole to coincide with the rotating shaft of the second driving device 44.

In case the center of gravity of the first support frame 10, the support assembly 20, the second support frame 40, the third support frame 40a, and the imaging device 200 as a whole deviates from the center of rotation of the driving portion 40b, the center of gravity of the first support frame 10, the support assembly 20, the second support frame 40, the third support frame 40a, and the imaging device 200 as a whole may be adjusted by the third center of gravity adjusting assembly 73 to cause the center of gravity of the first support frame 10, the support assembly 20, the second support frame 40, the third support frame 40a, and the imaging device 200 as a whole to coincide with the center of rotation of the driving portion 40b. In some embodiments, by rotating the second rotating handle 7320, the third threaded rod 732 may be rotated within the second bearings 731 and the second threaded hole 7333 of the moving member 733, and the moving member 733 may be moved along a longitudinal direction of the third threaded rod 732, thereby causing the center of gravity of the first support frame 10, the support assembly 20, the second support frame 40, the third support frame 40a, and the imaging device 200 as a whole to coincide with the center of rotation of the driving portion 40b.

It will be appreciated that the second rotating handle 7320 may be replaced with a driving motor that may drive the third threaded rod 732 to rotate.

It will be appreciated that, the structure of the third center of gravity adjusting assembly 73 may not be limited to the illustrated embodiment, so long as the position of the third-frame pillar 43 on the connecting plate 45 can be adjusted to cause the center of gravity of the first support frame 10, the support assembly 20, the second support frame 40, the third support frame 40a, and the imaging device 200 as a whole to coincide with the center of rotation of the driving portion 40b.

It will be appreciated that not all of the three center of gravity adjusting assemblies are needed. In some embodiments, only the first center of gravity adjusting assembly 71 may be provided. In some embodiments, the second center of gravity adjusting assembly 72 or the third center of gravity adjusting assembly 73 may be provided. In some embodiments, the first center of gravity adjusting assembly 71 and the second center of gravity adjusting assembly 72 may be provided. In some embodiments, the first center of gravity adjusting assembly 71 and the third center of gravity adjusting assembly 73 may be provided. In some embodiments, the second center of gravity adjusting assembly 72 and the third center of gravity adjusting assembly 73 may be provided.

The gimbal of the present disclosure may further comprise at least one center of gravity adjusting unit. The center of gravity adjusting unit may be at least provided on one of the first-frame pillars, between the two clamping devices or in the connecting plate to at least adjust the positions of the guiding posts on the first-frame pillars, the positions of the adaptors on the guiding posts, or the position of the third-frame pillar on the connecting plate. The gimbal may be configured to adjust the center of gravity of the gimbal by the at least one center of gravity adjusting unit.

The foregoing disclosure is merely illustrative of the embodiments of the disclosure but not intended to limit the scope of the disclosure. Any equivalent structural or equivalent flow changes, which are made without departing from the specification and the drawings of the disclosure, and a direct or indirect application in other relevant technical field, shall fall into the scope of the disclosure.

What is claimed is:

1. A gimbal for carrying an imaging device, comprising:
   a first support frame comprising:
      two first-frame pillars;
      two clamping devices arranged on the two first-frame pillars, respectively; and
      a guiding post connected between the two first-frame pillars through the two clamping devices, respectively, and configured to move along a longitudinal direction of the first-frame pillars;
   a second support frame pivotably connected with the first support frame;
   a third support frame pivotably connected with the second support frame, the third support frame comprising:
      a third-frame pillar connected with the second support frame; and
      a connecting plate movably arranged on the third-frame pillar;
   a support assembly comprising an adaptor slidably arranged on the guiding post; and
   a center of gravity adjusting unit being:
      arranged on one of the first-frame pillars and configured to adjust a position of the guiding post on the first-frame pillars, or
      arranged between the two clamping devices and configured to adjust a position of the adaptor on the guiding post, or
      arranged in the connecting plate and configured to adjust a position of the third-frame pillar on the connecting plate,
   wherein the center of gravity adjusting unit comprises a threaded rod, one end of the threaded rod being provided with a rotating handle or a driving motor configured to drive the threaded rod to rotate.

2. The gimbal of claim 1, wherein the center of gravity adjusting unit is arranged on the one of the first-frame pillars and configured to adjust the position of the guiding post on the first-frame pillars.

3. The gimbal of claim 2, wherein:
the center of gravity adjusting unit further comprises:
two snap rings sleeved at two ends of the one of the first-frame pillars, respectively,
one of the clamping devices is located between the two snap rings and comprises a collar having a threaded hole, and
the threaded rod is sleeved in the snap rings and threadedly connected with the threaded hole.

4. The gimbal of claim 3, wherein:
the center of gravity adjusting unit further comprises two bearings,
each of the two snap rings includes a bearing hole configured to receive one of the bearings, and
two ends of the threaded rod are received in the two bearings, respectively.

5. The gimbal of claim 3, wherein the collar comprises:
a pillar clamping hole having an axial direction approximately parallel to an axial direction of the threaded hole, the pillar clamping hole being configured to receive the one of the first-frame pillars, and a shape and a size of the pillar clamping hole corresponding to a shape and a size of the one of the first-frame pillars, respectively; and
a guiding post receiving portion having an axial direction approximately perpendicular to an axial direction of the pillar clamping hole, the guiding post receiving portion being configured to receive one end of the guiding post.

6. The gimbal of claim 5, wherein each of the clamping devices comprises a clamp locking member configured to release or lock the guiding post to allow an adjustment of a position of the guiding post on the corresponding first-frame pillar.

7. The gimbal of claim 1, wherein the center of gravity adjusting unit is arranged between the two clamping devices and configured to adjust the position of the adaptor on the guiding post.

8. The gimbal of claim 7, wherein:
the adaptor is a first adaptor,
the support assembly further comprises a second adaptor slidably arranged on the guiding post,
two ends of the threaded rod are fixed on the two clamping devices, respectively, and
the center of gravity adjusting unit further comprises:
a rotating member rotatably movably arranged on and threadedly connected with the threaded rod, the rotating member being arranged between the first adaptor and the second adaptor.

9. The gimbal of claim 8, wherein:
each of the clamping devices comprises a collar having a rod fixing hole provided at a middle position of the collar, and
two ends of the threaded rod are fixed in the two rod fixing holes, respectively.

10. The gimbal of claim 9, wherein:
the rotating member abuts against an inner sidewall of the first adaptor and an inner sidewall of the second adaptor, and
the rotating member includes a threaded hole at a central portion of the rotating member, the threaded hole being threadedly connected with the threaded rod.

11. The gimbal of claim 1, wherein the center of gravity adjusting unit is arranged in the connecting plate and configured to adjust the position of the third-frame pillar on the connecting plate.

12. The gimbal of claim 11, wherein:
the connecting plate comprises a bottom surface having a receiving groove,
the threaded rod is sleeved on two sidewalls of the receiving groove, and
the center of gravity adjusting unit further comprises:
a moving member rotatably movably arranged on the threaded rod, the moving member comprising:
a first moving portion fixedly connected with the second support frame; and
a second moving portion connected with the first moving portion and including a threaded hole, the threaded rod being inserted in the threaded hole and threadedly connected with the threaded hole.

13. The gimbal of claim 12, wherein:
the receiving groove comprises an outer sidewall,
the center of gravity adjusting unit comprises two bearings, one of the two bearings being fixed in the receiving groove, and another one of the bearings being fixed to the outer sidewall, and
one end of the threaded rod is sleeved in the one of the two bearings fixed in the receiving groove.

14. The gimbal of claim 1, wherein the support assembly further comprises:
a mounting plate fixed to the adaptor;
a supporting plate slidably arranged on the mounting plate; and
a press-locking device arrange at one side of the mounting plate and configured to fix the supporting plate on the mounting plate.

15. The gimbal of claim 1, wherein:
the adaptor comprises a first pressing block and a second pressing block disposed opposite to each other and jointly locked by a screw, a circular slot being formed between the first pressing block and the second pressing block,
the guiding post is inserted in the circular slot,
the adaptor is fixed on the guiding post when the screw is tightened and is capable of sliding on the guiding post along a longitudinal direction of the guiding post when the screw is released, and
a nut of the screw is fixed to a lever.

16. The gimbal of claim 1, wherein the second support frame comprises:
a driving device;
two second-frame pillars, one of the second-frame pillars being pivotably connected with a rotating shaft of one of the first-frame pillars, and another one of the second-frame pillars being pivotably connected with a rotating shaft of the other one of the first-frame pillars through the driving device; and
a connecting pillar connecting the two second-frame pillars, the two second-frame pillars and the connecting pillar jointly forming a U-shaped structure.

17. The gimbal of claim 16, wherein:
the driving device is a first driving device, and
the third support frame further comprises a second driving device rotatably connected to the connecting pillar to drive the second support frame to rotate, the second driving device being fixed to one end of the third-frame pillar, and another end of the third-frame pillar is connected to the connecting plate.

18. The gimbal of claim 17, further comprising:
a driving portion configured to drive the third support frame to rotate; and
a handle portion,
wherein the driving portion includes a brushless motor having a rotor connected to the connecting plate and a stator fixed to the handle portion.

19. A gimbal for carrying an imaging device, comprising:
a first support frame comprising:
 two first-frame pillars;
 a guiding post connected between the two first-frame pillars, and configured to move along a longitudinal direction of the first-frame pillars; and
 two clamping devices arranged on the two first-frame pillars, respectively, and connecting the guiding post to the two first-frame pillars;
a second support frame pivotably connected with the first support frame;
a third support frame pivotably connected with the second support frame, the third support frame comprising:
 a third-frame pillar connected with the second support frame; and
 a connecting plate movably arranged on the third-frame pillar;
a support assembly comprising an adaptor slidably arranged on the guiding post; and
a center of gravity adjusting unit arranged on one of the first-frame pillars and configured to adjust a position of the guiding post on the first-frame pillars.

20. A gimbal for carrying an imaging device, comprising:
a first support frame comprising:
 two first-frame pillars; and
 a guiding post connected between the two first-frame pillars and configured to move along a longitudinal direction of the first-frame pillars;
a second support frame pivotably connected with the first support frame;
a third support frame pivotably connected with the second support frame, the third support frame comprising:
 a third-frame pillar connected with the second support frame; and
 a connecting plate movably arranged on the third-frame pillar and comprising a bottom surface having a receiving groove;
a support assembly comprising an adaptor slidably arranged on the guiding post; and
a center of gravity adjusting unit arranged in the connecting plate and configured to adjust a position of the third-frame pillar on the connecting plate, the center of gravity adjusting unit comprising:
 a threaded rod sleeved on two sidewalls of the receiving groove; and
 a moving member rotatably movably arranged on the threaded rod, the moving member comprising:
  a first moving portion fixedly connected with the second support frame; and
  a second moving portion connected with the first moving portion and including a threaded hole, the threaded rod being inserted in the threaded hole and threadedly connected with the threaded hole.

* * * * *